US007760903B2

(12) United States Patent
Pullen et al.

(10) Patent No.: US 7,760,903 B2
(45) Date of Patent: Jul. 20, 2010

(54) TAMPER-RESISTANT TEXT STREAM WATERMARKING

(75) Inventors: Walter D. Pullen, Seattle, WA (US); Bradley D. Miller, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 946 days.

(21) Appl. No.: 11/215,748

(22) Filed: Aug. 30, 2005

(65) Prior Publication Data

US 2007/0047758 A1 Mar. 1, 2007

(51) Int. Cl.
*G06K 9/00* (2006.01)
(52) U.S. Cl. .................................................. 382/100
(58) Field of Classification Search ................ 713/200, 713/201, 202, 176, 189–194; 715/531, 530; 382/100, 112; 380/1, 200, 201, 252–254
See application file for complete search history.

(56) References Cited

U.S. PATENT DOCUMENTS

| 5,586,280 | A  | * | 12/1996 | Simms | 711/4 |
| 6,175,925 | B1 |   | 1/2001  | Nardone et al. | 713/200 |
| 6,330,672 | B1 | * | 12/2001 | Shur | 713/176 |
| 6,449,380 | B1 | * | 9/2002  | Acharya et al. | 382/100 |
| 6,782,509 | B1 | * | 8/2004  | Hirayama et al. | 715/210 |
| 2003/0217280 | A1 | * | 11/2003 | Keaton et al. | 713/193 |
| 2004/0071314 | A1 | * | 4/2004  | Yacobi | 382/100 |
| 2004/0202324 | A1 | * | 10/2004 | Yamaguchi et al. | 380/201 |
| 2005/0021966 | A1 |   | 1/2005  | Chow et al. | 713/176 |
| 2005/0039021 | A1 |   | 2/2005  | Alattat et al. | 713/176 |
| 2005/0144458 | A1 | * | 6/2005  | Venkatesan et al. | 713/176 |

* cited by examiner

*Primary Examiner*—Samir A. Ahmed
*Assistant Examiner*—Atiba O Fitzpatrick
(74) *Attorney, Agent, or Firm*—Merchant & Gould

(57) ABSTRACT

A tamper-resistant text stream watermarking system is provided. Content such as any text-based document including programming code is encoded with a watermarking mechanism. The mechanism modifies the text itself according to a preset repeating pattern without changing the substance. Examples include patterned use of white spaces, contractions, abbreviations, order of local variables in programming code, and the like. The pattern may include a binary fingerprint that can be used to trace the watermarked document to an assigned source or version of the original document. In analyzing a suspect text stream, patterns are generated based on instances of the mechanism and their corresponding bit values. Repeating patterns are combined into a bit stream along with separators between each pattern. The bit stream can then be analyzed to determine a source of the watermarked text stream.

20 Claims, 8 Drawing Sheets

TAMPER-RESISTANT TEXT STREAM WATERMARKING

BACKGROUND

The Internet is an open network, increasingly used for delivery of digital contents. In the digital format, content is expressed as streams of bits that can be transported flawlessly. Transmitted content can be copied perfectly infinite times. Users can also manipulate these files.

Content protection mechanisms such as digital watermarking attempt to protect the rights of the content creator, the distributor, and the user. The content owner may deposit a unique description of the original content to a neutral registration authority. The unique distribution may be hash value or textual description. The registration authority may allot a unique identification number to the content, and archive the unique identification number and the content for future reference. This unique identification number may also be conveyed to the content owner.

The content owner may derive suitable parameters, which may be a digital watermark pertaining to the unique identification number. The digital watermark is securely and secretly merged with the original content itself. One of the goals is to degrade the digital watermarked content's quality minimally. The content owner can prove the origin of creation by extracting the watermark from the watermarked content.

SUMMARY

A digital stream is encoded with a watermarking mechanism. The mechanism may modify the stream itself according to a preset repeating pattern without changing a substance of the text-based stream. Examples include patterned use of white spaces, contractions, abbreviations, order of local variables in programming code, and the like.

A decoder application analyzes another text-based stream to determine whether it is derived from the first stream. The analysis may include detecting repeating patterns in the other text-based stream based on the known watermarking mechanism.

The patterns may include a binary fingerprint that can be used to trace the watermarked stream to an assigned source or version of the original stream. Patterns may be generated based on instances of the watermarking mechanism and their corresponding bit values. Repeating patterns may be combined into a bit stream along with separators between each pattern.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Illustrative Operating Environment

Figure 1:
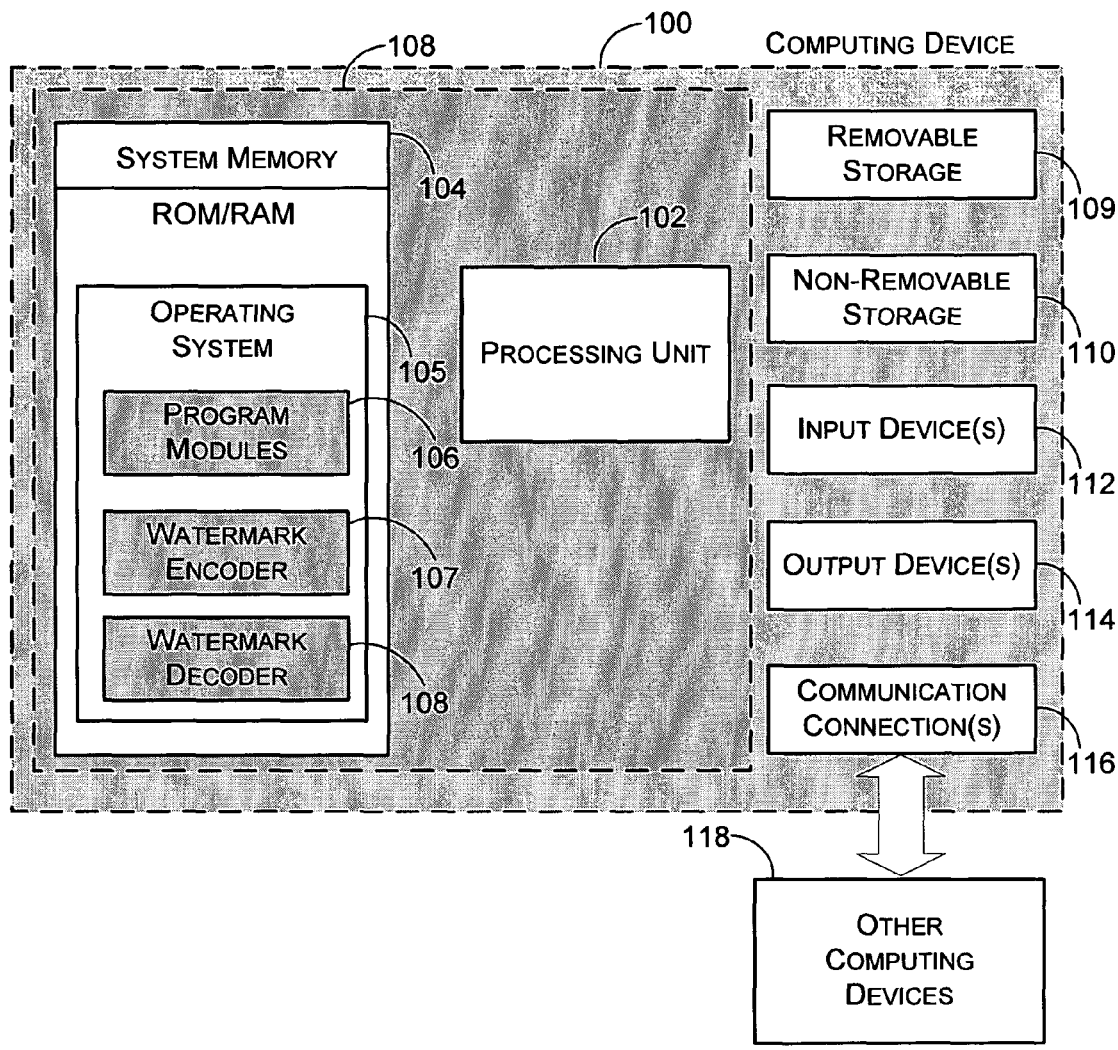
FIG. 1 illustrates a computing device in which a tamper-resistant text stream watermarking application according to an example aspect may be executed.

Referring to FIG. 1, an example system for implementing some embodiments includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes operating system 105, one or more program modules 106 working within operating system 105. In addition to program modules 106, watermark encoder application 107 and watermark decoder application 108 may also reside in system memory 104.

Watermark encoder application 107 may encode text documents such as word processing documents, spreadsheets, and the like, as well as programming code with a watermarking mechanism such that an origin of the document may be determined with certainty. Watermark decoder application 108 may perform a complementary operation and determine whether a document such as those described above include a watermark mechanism.

In one embodiment, watermark encoder application 107 and watermark decoder application 108 may interact with other applications to receive the documents to be encoded or decoded, as well as the watermark mechanism. They may also provide watermarked document or the results of watermarking analysis. For that purpose, watermark encoder application 107 and watermark decoder application 108 may interact with other computing devices through communication connection(s) 116.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data.

System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as retail devices, keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Figure 2:
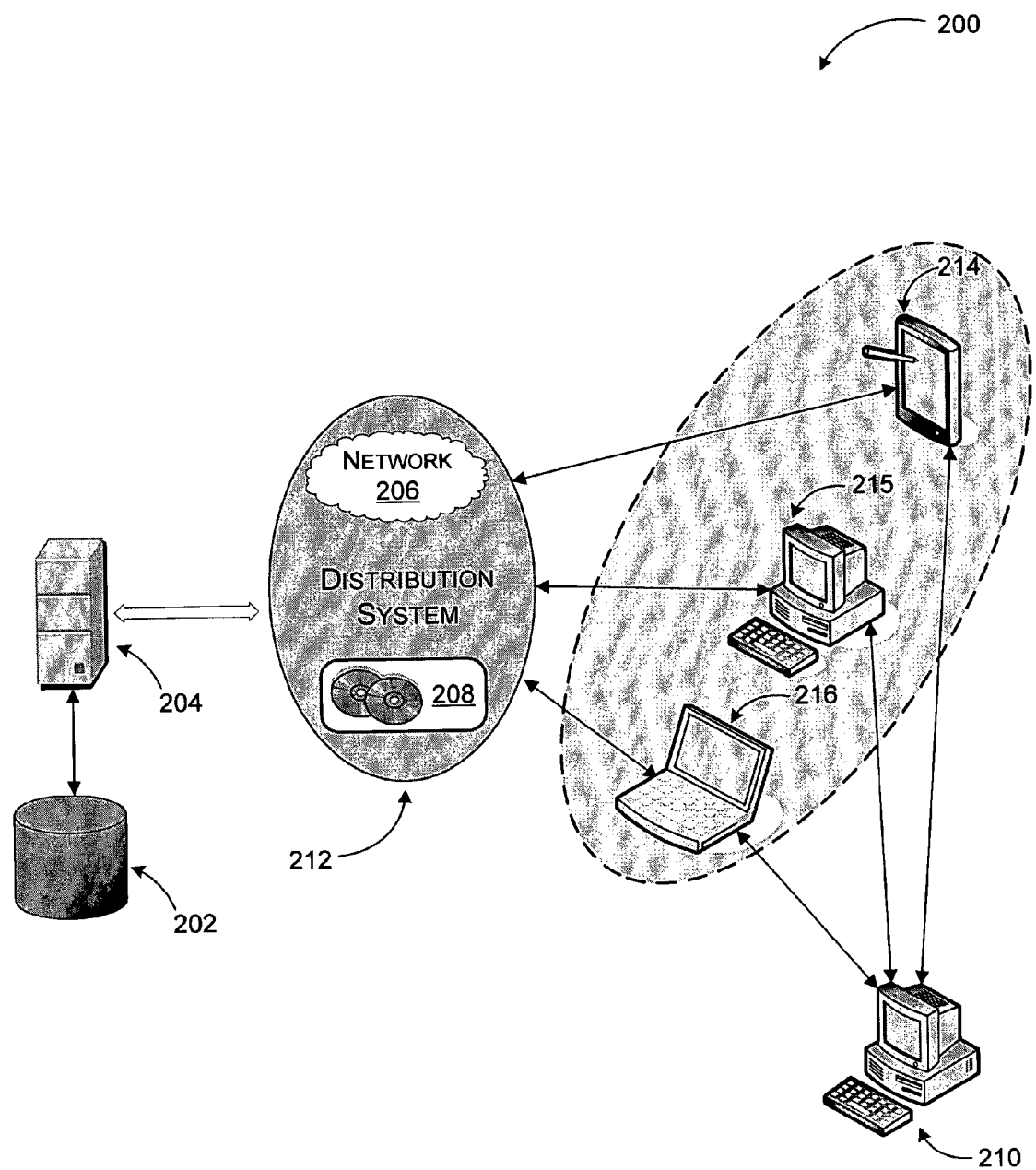
FIG. 2 illustrates example systems, where tamper-resistant text stream watermarking may be implemented.

Referring to FIG. 2, the diagram illustrates example systems 200, where embodiments of a tamper-resistant text stream watermarking system may be implemented.

Server 204 is representative of a computing device, where a tamper-resistant text stream watermarking application may be executed to watermark a text stream such as a word processing document, a spreadsheet, programming code, and the like. Server 204 may also execute the same application or another application to analyze a document to determine whether it is watermarked and decode the watermarking mechanism. To perform these operations, server 204 may interact with other computing devices or storage media such as storage 202 to receive the original text stream, the watermarking mechanism, the watermarked document, and the like.

In one embodiment, server 204 interacts with additional computing devices, such as computing devices 214-216, to provide the watermarked document or receive a suspect document to analyze. Distribution system 212 represents different methods of delivering the watermarked and suspect documents to and from other computing devices.

Distribution system 212 may include network 206. Network 206 may be a secure network such an enterprise network, or an unsecure network such as a wireless open network. Network 206 provides communication between the nodes described above. By way of example, and not limitation, network 206 may include wired media such as a wired network or direct-wired connection, and wireless media such as acoustic, RF, infrared and other wireless media. Network 206 may comprise any topology of servers, clients, Internet service providers, and communication media. Network 206 may also have a static or dynamic topology.

In another embodiment, distribution system 212 may include computer-readable media 208, such as CD-ROMs, DVDs, flash memory modules, and the like, which may be exchanged between users.

Computing devices 214-216 may include any type of computing device including, but not limited to, handheld computer 214, desktop computer 215, and laptop computer 216.

The present invention is not limited to the above-described environment, however. Many other configurations of computing devices, communications, applications, and distribution systems may be employed to implement a tamper-resistant text stream watermarking system.

Illustrative Embodiments For A Tamper-Resistant Text Stream Watermarking System

Embodiments are related to providing watermarking and analysis of watermarking for text streams.

Sharing source code or other sensitive documents that can be represented as a run of text poses a risk of the content being distributed to unauthorized users. All or part of the content may be accidentally or intentionally leaked to the public, or used in an authorized manner. It is typically difficult to trace the leak back to the individual or group that let it happen. Moreover, proving plagiarism can also be complicated when content is modified.

Embodiments enable watermarking of text stream content such that one can prove it was marked, and be able to extract the watermarking mechanism to trace the content to a source. The watermarking mechanism can be mapped to a person or group, where different instances of the content can be marked with different fingerprints.

Figure 3:
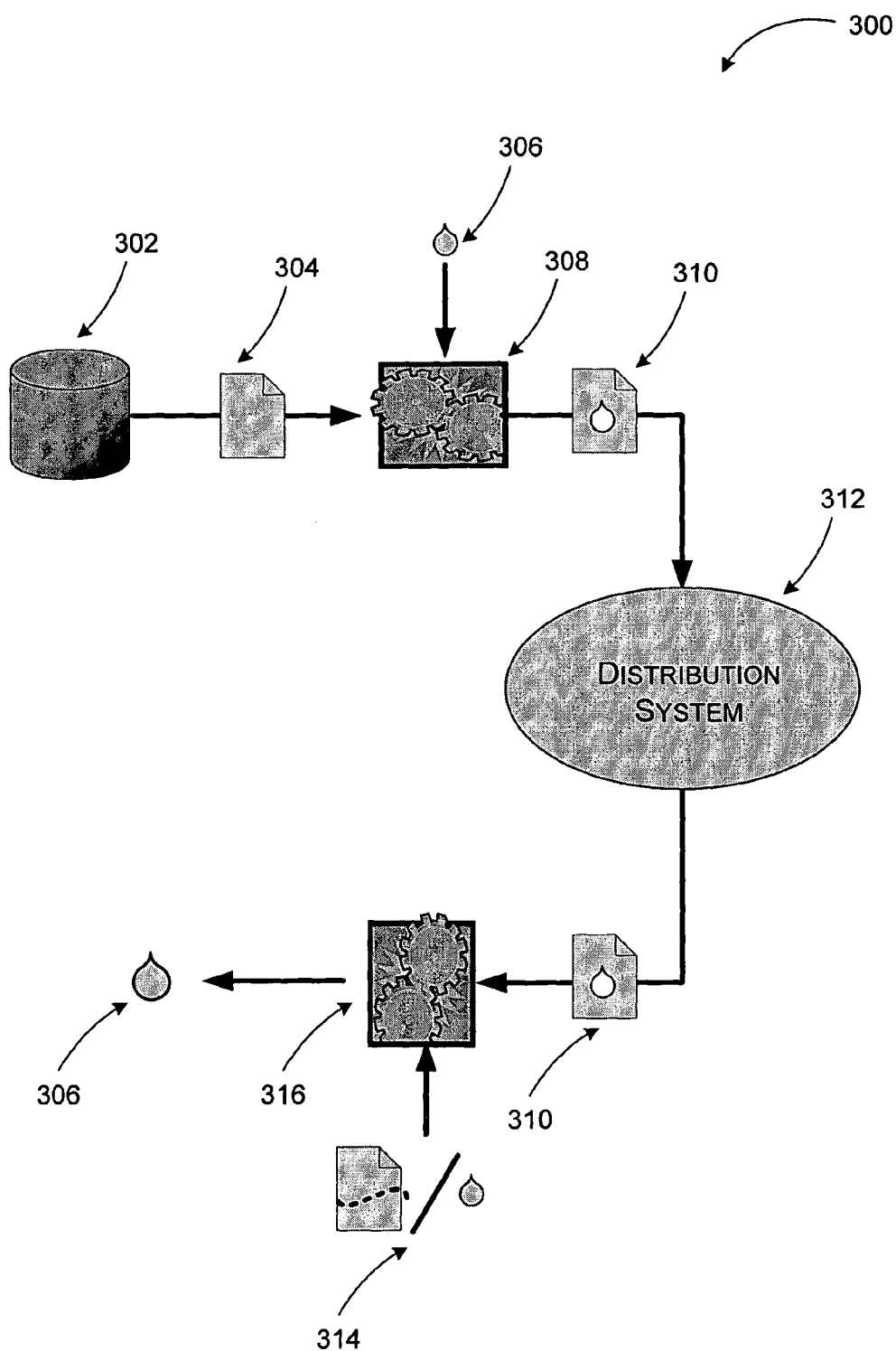
FIG. 3 is a conceptual diagram illustrating encoding and decoding of a text document according to aspects.

FIG. 3 illustrates conceptual diagram 300 illustrating encoding and decoding of a text document according to an aspect.

Text stream watermarking can be described through a set of definitions: Steganography is the general area of hiding one set of content within another. Watermarking is hiding a recognizable piece of content in another such as a picture or a message. Fingerprinting is hiding different identification numbers in different instances of content.

Encoding a watermarking mechanism or a fingerprint is the process of modifying a document or a run of text to include the watermark or an identification number in it. According to embodiments, identification numbers of any size may be encoded to text streams. For example, a software program that is to be distributed to no more than 2^5 or 32 test clients may be encoded with an identification number of 5 bits. If a larger number of sources need to be tracked, the bit size of the identification number (fingerprint) may be increased.

Referring to FIG. 3, conceptual diagram 300 includes storage medium 302, which provides content 304 to encoding application 308. Content 304 may include any form of text stream such as word processing documents, spreadsheets, other computer generated text-based documents, programming code, and the like.

Encoding application 308 is arranged to receive watermarking mechanism 306 and encode content 304 with watermarking mechanism 306.

Watermarking mechanism 306 according to an embodiment does not modify or degrade a substance of the text stream. For example, if the content is software code, it still compiles the same way and performs the same function as the original. The watermarking mechanism may be applied to all or part of the content. While a uniform application of the watermarking throughout the content may improve an ability to detect any portion of the content later in other forms, some users may prefer to apply watermarking to select portions.

The watermarking mechanisms do not have to be subtle. In one embodiment, the mechanism may comprise a comment inserted at preset intervals within a programming code. Such mechanisms may, however, be more vulnerable to detection and removal by unauthorized users.

Figure 4:
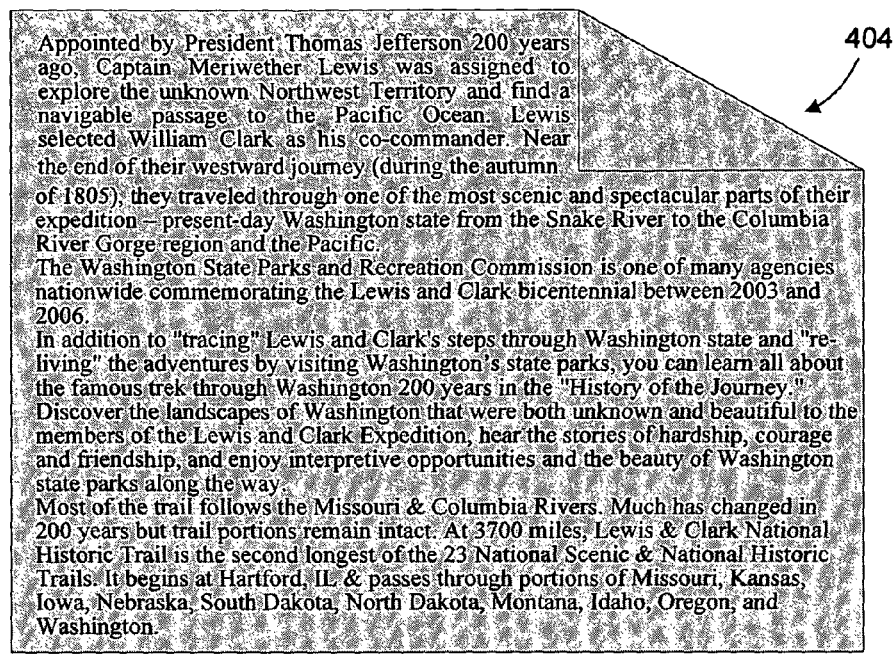
FIG. 4 illustrates an original text document and the watermarked version of the same document according to a selected pattern.
Figure 4:
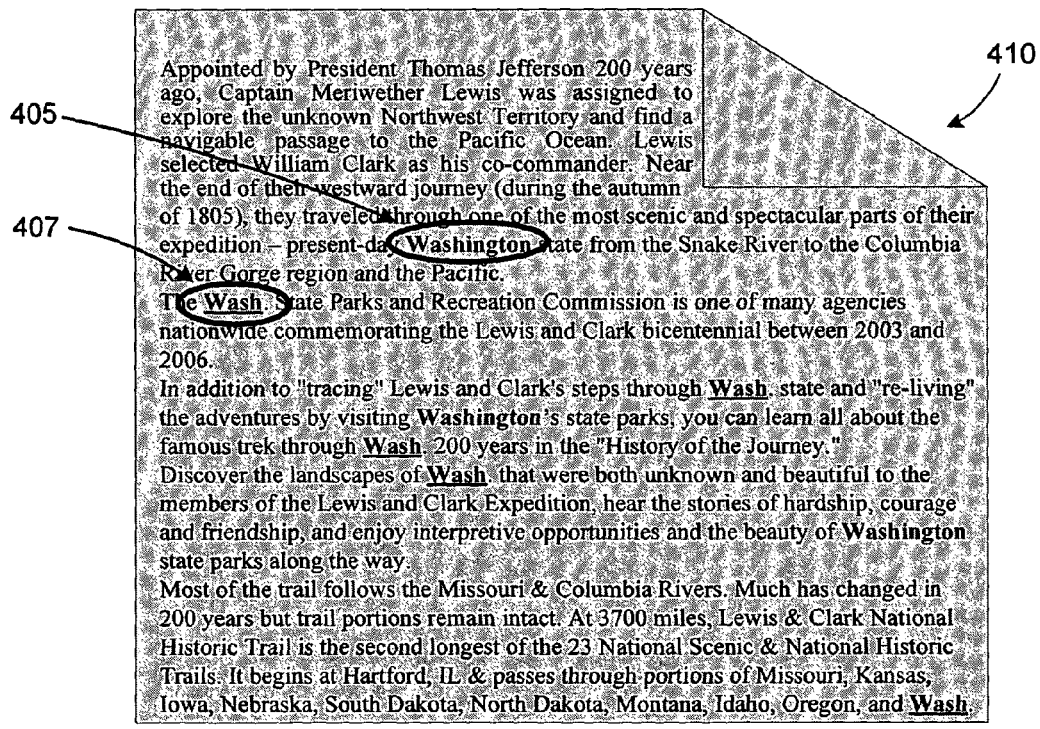
Figure 4:
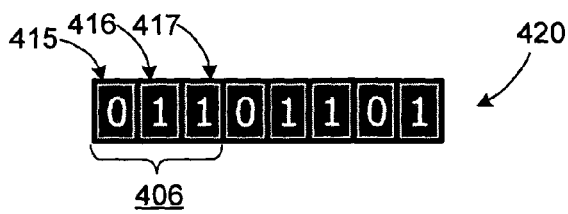
Figure 5:
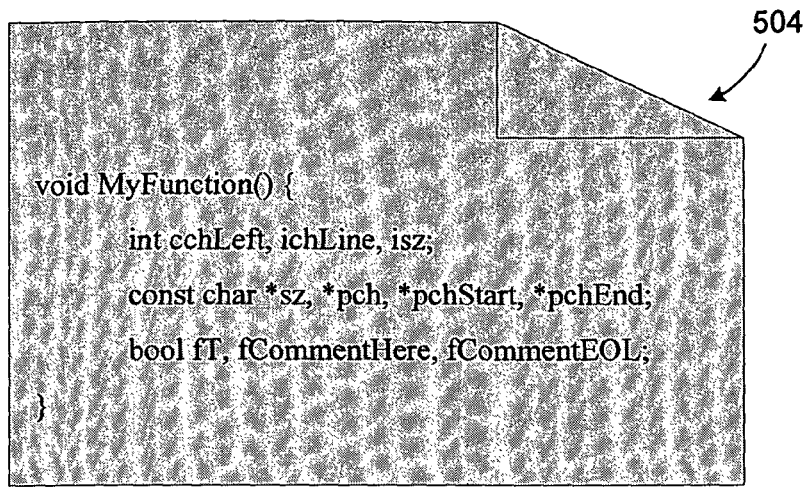
FIG. 5 illustrates an original programming code and the watermarked version of the same programming code according to another selected pattern.
Figure 5:
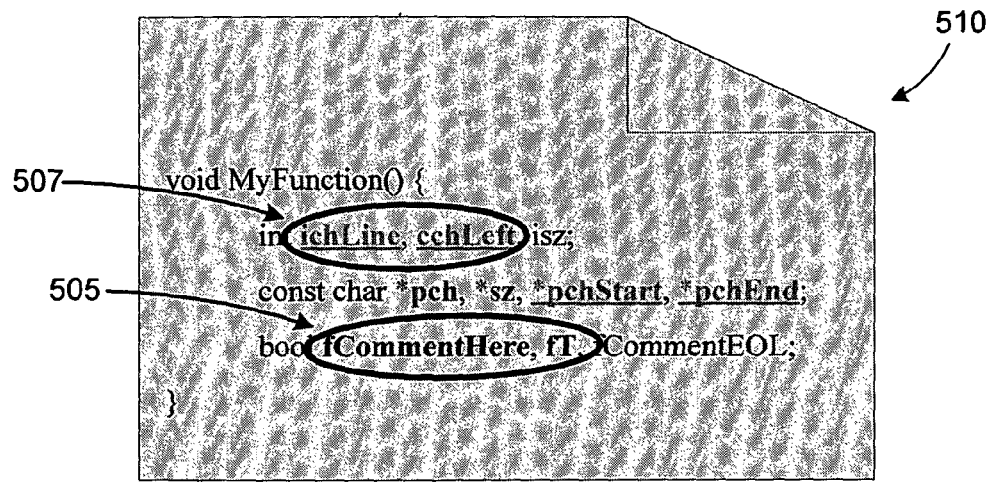
Figure 5:
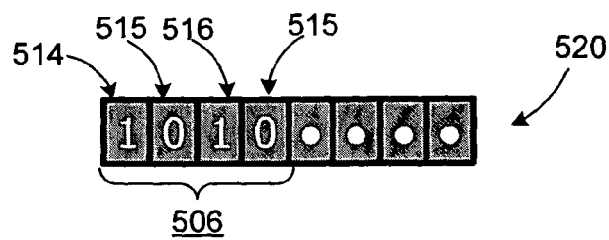

Subtle mechanisms may include blank line runs, spaces before tabs at start of line, spaces at end of line, line break types such as having an extra carriage return (CR) before a carriage return line feed (CRLF), banner comment character runs, and contraction modification. Two additional mechanism examples using fully spelled-out versus abbreviated versions of a word and using ordered versus non-ordered variables in a programming code are illustrated in FIGS. 4 and 5.

Encoding application 308 subsequently provides watermarked content 310 to distribution system 312. Distribution system 312 may include network communications, removable storage media, and any other form of distribution for the content.

At some point, there may be a need to analyze watermarked content 310 for its watermarking mechanism. For example, a suspect document or programming code may be analyzed to determine if it contains portion(s) of the original content. In another example, a source for content, which found to be distributed to unauthorized users, may be traced through analysis of a fingerprint used to watermark the content.

Decoding application 316 may be used to determine watermarking in watermarked content 310. Decoding is essentially a reverse of the encoding process, i.e. the process of taking a document, a portion of text, or source code, and determining whether it has been watermarked with a known mechanism. The decoding process does not have to depend on having a copy of the original content available to compare against. This allows the decoding process to be simpler and more resistant to edits. For example, an input source file may have sections of code rearranged or contain sections from different files, but fingerprints in the portions from the original programming code may still be determined.

Because there may be an unknown number of watermarking mechanisms, decoding application 314 is arranged to receive watermark mechanism 306 or at least a portion of the original content for the decoding process.

Upon completion of the decoding process, decoding application 316 may provide watermark mechanism 306 to another application. The other application may determine a source of the content based on a fingerprint or a likelihood of one or more portions of the suspect content being derived from the original content. A statistical analysis method known in the art may be employed to determine the likelihood based on repetitions of the pattern in the suspect content.

Watermarking a text stream according to an embodiment has a number of advantages that include:

Application to text streams: Commonly used forms of watermarking are geared towards images, audio, and video content. They involve mechanisms like changing a size or a location of characters slightly, inserting additional bits into an audio stream, and the like. Similar techniques, when applied to text, can be removed by reproduction methods such as Optical Character Recognition (OCR) scanning the document into plain text. By applying the watermarking mechanism to the text itself, the watermark is preserved even when the text is represented in other forms such as reformatted, or even handwritten.

Hidden: Encoding mechanisms according to one embodiment can be hidden and not obvious from inspecting the content. For example, a story can still read the same; and a section of source code can still compile and behave the same way with the watermarking applied.

Tamper resistant: Text stream watermarking according to an aspect is relatively resistant to edits. If the text stream is modified, the watermark is still detectable to a high degree of confidence depending on the selected mechanism. Such edits may include inserts, deletes, swapping blocks of text, and extracting subsections of the original content.

Independent decoding: Detecting a watermark according to most embodiments does not require the complete original text stream to compare against. Given any portion of text from any source, it can be determined whether the text was watermarked, and if so what mechanism was encoded within the text. That mechanism enables determination of the source, e.g. where the text came from and/or whose instance it is.

Arbitrary length watermarks: Numbers of arbitrary length (given enough text to place the watermark within) may be encoded. This prevents the limitation of having to decide ahead of time how many fingerprints are to be supported, and reduces the risk of running out of available fingerprints once a number of instances of the content is watermarked.

In addition to the above listed examples, many other mechanisms, subtle or not subtle, may be employed for tamper-resistant watermarking of text streams following the principles described herein. Such mechanisms may include any form of syntax modification, word replacements, and the like.

FIG. 4 illustrates an original text document and the watermarked version of the same document according to a selected pattern.

Document 404 is an example text that includes repeated use of the word "Washington". As mentioned above, use of fully spelled-out and abbreviated forms of certain words is one example of tamper-resistant text stream watermarking in binary format. The two forms of the same word may be used in a predetermined pattern to generate "0" and "1" bit values for a binary watermarking mechanism.

The repeated use of the word "Washington" in the example text of document 404 enables relatively effortless encoding of a binary watermarking mechanism.

Document 410 is the watermarked version of the example text with some of the instances of the word "Washington" being abbreviated according to a predetermined pattern. A length and order of the pattern may be selected according to a desired complexity and purpose of the watermarking.

In the watermarked example text, fully spelled-out word "Washington" 405 corresponds to bit value "0" and abbreviated word "Wash" 407 corresponds to bit value "1" (both words are printed in bold font, the word "Wash" is also printed in underlined font). A closer inspection also reveals that the used pattern is one fully spelled-out word followed by two abbreviated words.

As the figure shows, the watermarking does not degrade a quality or change a substance of the text. Furthermore, the mechanism is resistant to many types of tampering including, but not limited to, reformatting, copying, scan-and-reprint type reproductions, and even copying of the text by hand.

The more the pattern is repeated, the stronger the mechanism becomes against cut-and-paste type modifications, because the likelihood of a number of patterns being carried along with the copied portion increases with the number of patterns used in the watermarked text.

Bit stream 420 represents the bit values corresponding to the instances of the watermarking mechanism as found in the example text. First pattern 406 in the bit stream includes bits 415, 416, and 417 with values "0", "1", and "1", respectively.

The predetermined example pattern is repeated, as are the instances of the mechanism in the example text. Bit stream 420 does not include separators between patterns.

The example mechanism and pattern provided above does not constitute a limitation on embodiments. Other embodiments using different mechanisms and size or order of patterns may also be employed using the principles described herein. Moreover, non-binary mechanisms may also be used.

FIG. 5 illustrates an original programming code and the watermarked version of the same programming code according to another selected pattern.

Document 504 is an example programming code that includes ordered and non-ordered variables. For each swappable pair of local variables on consecutive lines or the same line (i.e. they are not C++ classes or auto-initialized), if the variables are in sorted order a "1" may be generated in the pattern. Otherwise, a "0" may be generated.

In document 510, local variables ichLine and cchLeft (507) are not ordered resulting in bit 514 of pattern 506 (in bit stream 520). Next, variables *pch and *sz are ordered resulting in "0" value bit 515. This is followed by not-ordered variable pair *pchStart and *pchEnd resulting in "1" value bit 516, and ordered pair fCommentHere and fT (505) resulting in "0" value bit 517.

A re-ordering of the local variables between documents 504 and 510 does not affect a substance of the programming code. The code may be compiled and executed without any effect, while the watermarked version can be traced to a source using the fingerprint pattern 1010.

It should be noted, that encoding may be performed in ways that produce non-binary values. For example, the number of spaces at the end of a line may represent a non-negative number.

Figure 6:
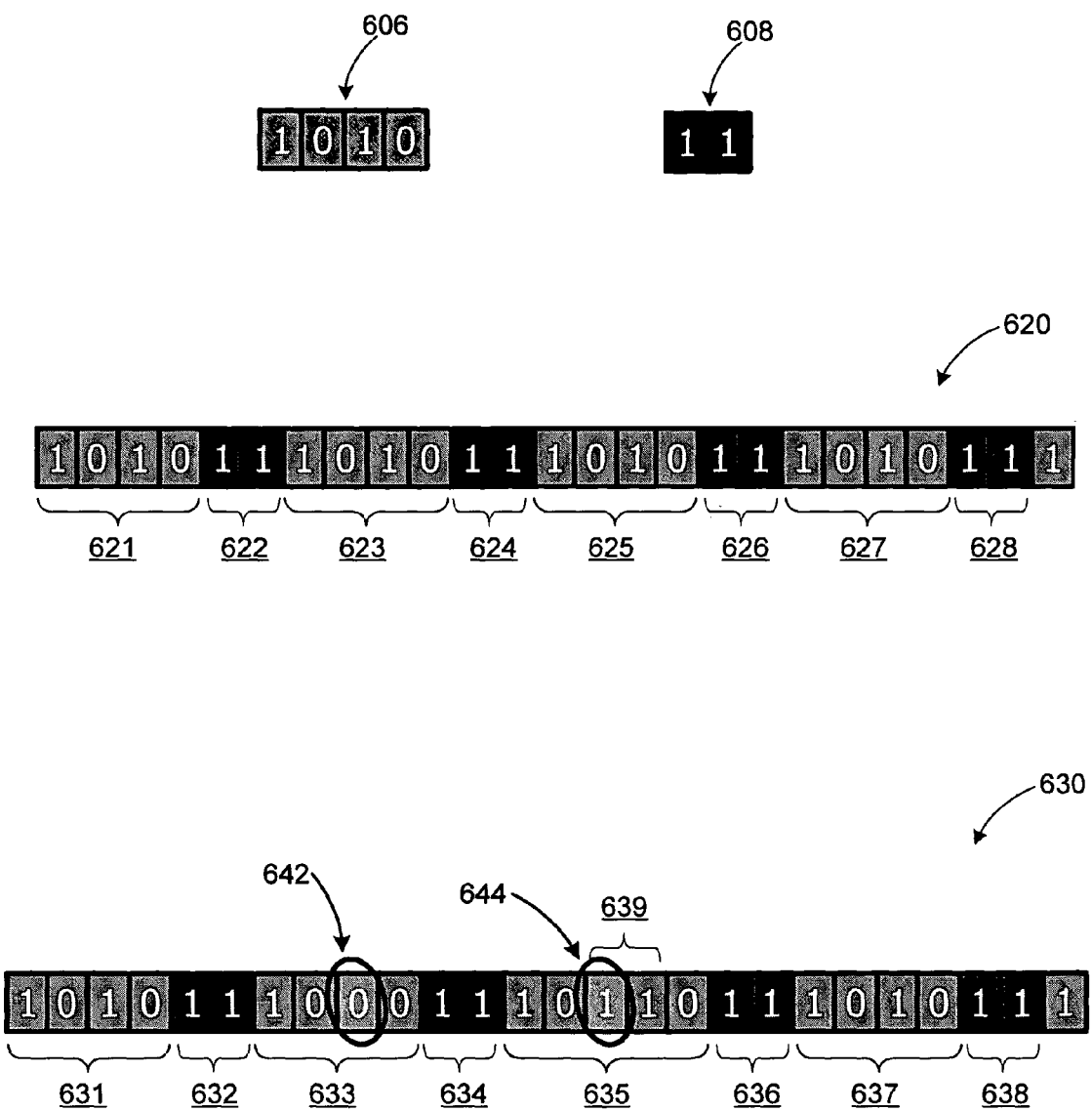
FIG. 6 illustrates an example pattern, an example separator, a bit stream comprising the example pattern and the separator, and another bit stream with broken patterns.

FIG. 6 illustrates an example pattern, an example separator, a bit stream comprising the example pattern and the separator, and another bit stream with broken patterns.

Example bit pattern 606 is the same as the pattern used in example watermarking of FIG. 5. Pattern 606 is a particular sequence of bits of a preset length (four in this example), which is encoded in a bit stream. In one embodiment, pattern 606 may represent an identification number (fingerprint) encoded into the text stream. Identification numbers may map to a table of sources such as clients accessing the content. In another example, identification numbers may be used to identify versions of the content. Pattern 606 is encoded over and over through the bit stream, for later extracting.

It should be noted that the pattern is not necessarily the identification number converted to binary format, because patterns can have different lengths and leading 0's. For example, a pattern of 001 is different from 00001. Also patterns do not contain the bit sequence of a separator within them. Accordingly, identification numbers may be translated to patterns. For a given length n, there are 2^n potential patterns.

Separator 608 is a fixed sequence of bits, which are placed between each instance of a pattern in a bit stream. Separator 608 is maintained uniform for a given mechanism, regardless of the pattern. To distinguish the pattern from the separator, a pattern cannot contain the bit sequence of the separator. Also, when the pattern has the separator appended to it, the combined bits cannot contain the separator either, except at the very end. For example, with a pattern of 0011 and a separator of 101, a length 25 bit stream encoding four instances of the pattern looks like:

0011101001110100111010011.

Separator 608 is used as a synchronization mechanism to determine where patterns start and end. Separator 608 enables watermarking mechanism to support patterns of arbitrary length, to know where a pattern starts given a subsection of a bit stream, and to be resistant to tampering which may insert or delete bits at points in the stream. If the separators were left out in the above example, the bit stream would become 0011001100110011, making it difficult to determine whether the patterns are 0011, 00110011, or 1001.

Separator 608 can be any non-empty bit pattern. A typical separator is a sequence of 1's with 0's capping each end. With a separator of 0110, for example, the pattern may not contain a run of exactly two 1's, since the pattern would look similar to the separator and be ambiguous. A run of less than two or more than two 1's may be used without the ambiguity problem though.

For example, of the 2^5-1 or 31 possible patterns of up to length 4, with a separator of 0110, the 23 valid patterns that can be used as follows (with the 8 invalid patterns underlined):

{empty}, 0, 1, 00, 01, 10, 11, 000, 001, 010, 011, 100, 101, 110, 111, 0000, 0001, 0010, 0011, 0100, 0101, 0110, 0111, 1000, 1001, 1010, 1011, 1100, 1101, 1110, 1111.

Alternative synchronization methods may also be employed. For example, patterns may start at the beginning of C functions.

The bit stream is a sequence of 1's and 0's that can be extracted from a section of text or programming code for a particular mechanism. A run of text can be watermarked to have multiple bit streams if it is fingerprinted using multiple mechanisms at the same time. Each bit is derived from one instance of the mechanism. For example, an even number of blank lines may be considered a "0", and an odd number may be considered a "1". In another example, no white space at the end of a line may be considered a "0", and any white space at the end a line may be considered a "1".

Bit stream 620 includes a run of pattern 606 with one instance of separator 608 inserted between each pattern in the bit stream. Bit sequences 621, 623, 625, and 627 are the patterns, while bit sequences 622, 624, 626, and 628 are the separators.

As mentioned previously, original content may be subjected to edits such as inserts, deletes, and modifications. The content to be analyzed may only contain portions of the original content. In such cases, the original bit stream may be modified as well with a number of patterns removed, broken or their order changed.

Because the patterns in the bit stream are repeated over and over, an order of the patterns does not affect the ability of a decoding application to determine the watermark. Although, the higher the number of patterns detected in a suspect text, the higher the likelihood of proving that is derived from an originally watermarked text.

Similarly, the fact that some of the patterns in the bit stream are broken does not prevent the watermarking mechanism from being used to trace a source of the suspect content. If a sufficient amount of text from the original content is included in the suspect content, adequate number of patterns can be detected to prove relation or trace the source.

Bit stream 630 is an example of a bit stream with broken patterns (e.g. 633 and 635). Similar to bit stream 620, bit sequences 631, 633, 635, and 637 are the patterns, while bit sequences 632, 634, 636, and 638 are the separators. In pattern 633, third bit 642 is modified from an expected "1" to a "0". In pattern 635, an extra bit 644 is inserted in the middle of the pattern resulting in an extra separator 639 in bit stream 630.

Figure 7:
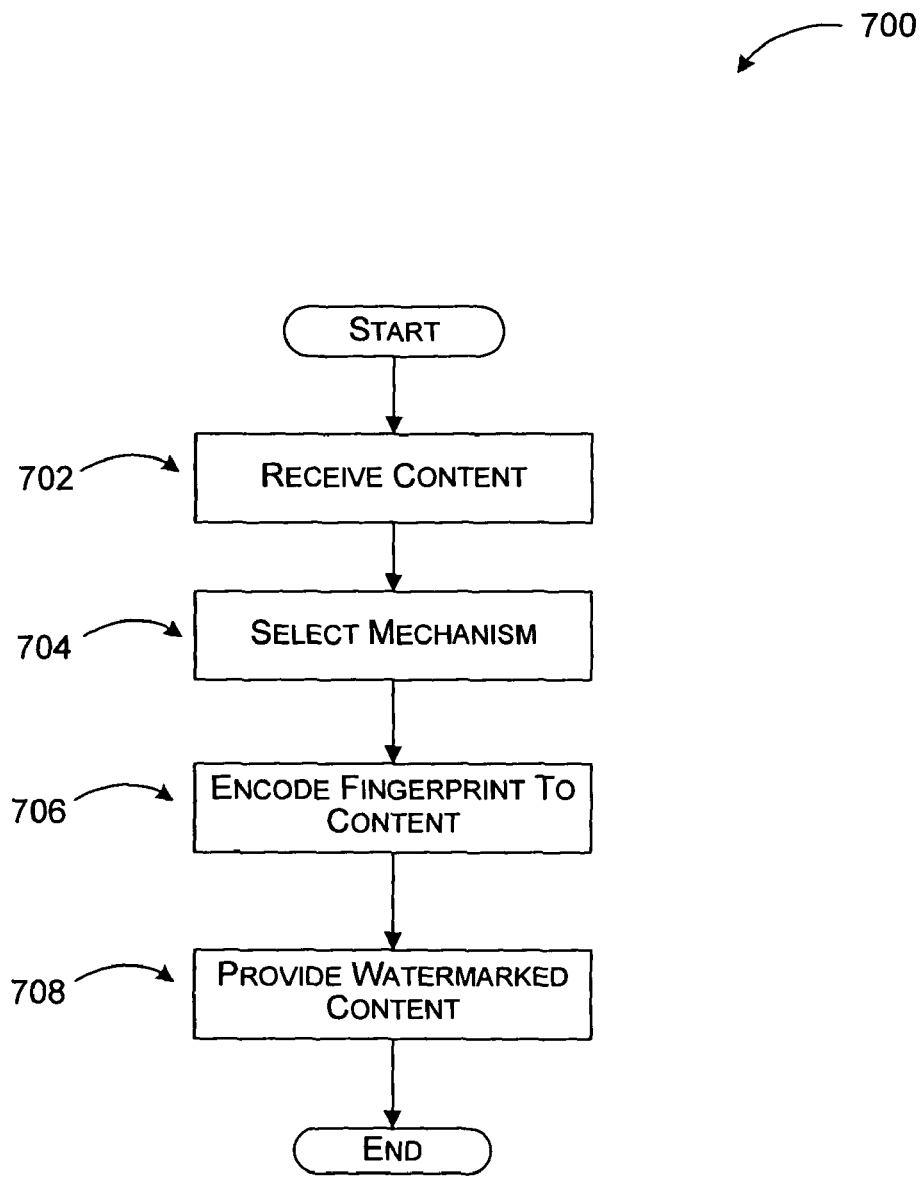
FIG. 7 illustrates a logic flow diagram for a process of encoding content for tamper-resistant text stream watermarking.

FIG. 7 illustrates a logic flow diagram for process 700 of encoding content for tamper-resistant text stream watermarking.

Process 700 begins at operation 702, where content to be watermarked is received. According to embodiments, such content may include any type of text, text-based document, programming code, and the like. Processing advances to operation 704.

At operation 704, watermarking mechanism is selected. Watermarking mechanism may be selected from a pool of predetermined mechanisms, provided by an external application, and the like. Watermarking mechanism may include one of the methods described herein, for example, syntax modification, patterned use of contractions, use of white spaces, and the like. In some embodiments, fingerprinting may be used with an incremented mechanism being implemented to identify authorized users (distributees) of the text stream. Processing moves from operation 704 to operation 706.

At operation 706, the selected mechanism is implemented. In one embodiment, fingerprint is encoded to the content. Example implementations of the watermarking mechanism are described in conjunction with FIGS. 4 and 5. Processing proceeds from operation 706 to operation 708.

At operation 708, watermarked content is provided to intended targets. As described previously, watermarked content may be delivered via a wide variety of methods including, but not limited to, network communications, removable storage medium, and any other physical medium such as printed copies, even handwritten copies. After optional operation 708, processing moves to a calling process for further actions.

Figure 8:
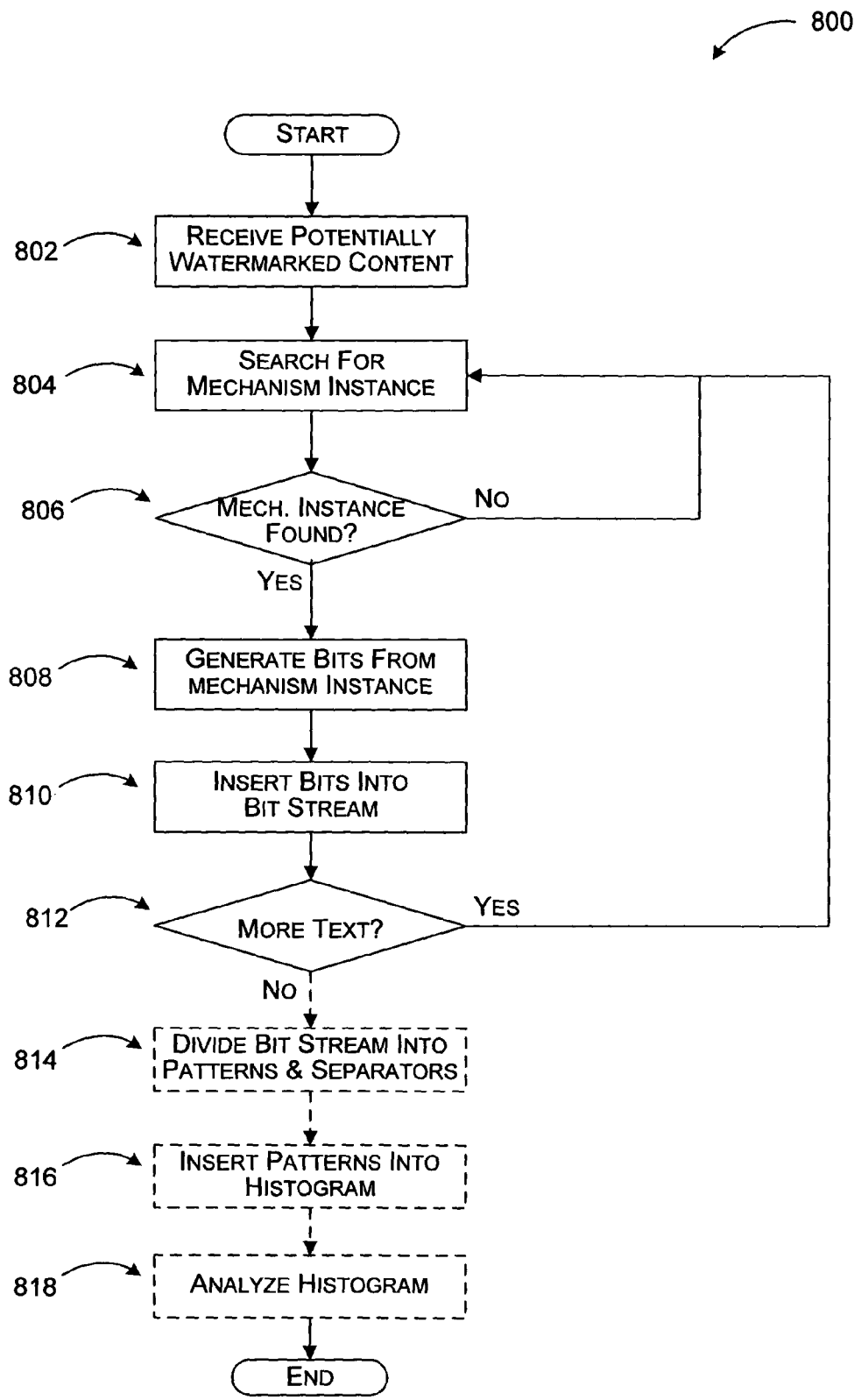
FIG. 8 illustrates a logic flow diagram for a process of decoding watermarked content in an example tamper-resistant text stream watermarking system.

FIG. 8 illustrates a logic flow diagram for process 800 of decoding watermarked content in an example tamper-resistant text stream watermarking system.

Process 800 begins at operation 802, where potentially watermarked content is received. Content that was originally watermarked for protection or other purposes may be modified, reduced, enlarged, even reproduced by unauthorized users. Accordingly, original watermarking patterns may have been removed, broken, and the like. Processing advances from operation 802 to operation 804.

At operation 804, the decoding application searches for instances of the watermarking mechanism. As explained before, watermarking mechanism may take a number of different forms. In one embodiment, two different forms of a mechanism may be employed that correspond to "0" and "1" bit values in binary implementation. A pattern may be formed by applying the two mechanism forms in a preset order. The decoding application searches and notes every instance of the mechanism (i.e. each form). Processing moves from operation 804 to decision operation 806.

At decision operation 806, a determination is made whether a mechanism instance is found. If the instance is found, processing moves to operation 808. Otherwise, processing returns to operation 804 for further search of the mechanism instances.

At operation 808, bit values are generated from the found mechanism instance. The bit values may include a series of "0" and "1" bits depending on the form of the mechanism instance. For example, the bit value corresponding to the fully spelled-out state name "Washington" is "0" and to the abbreviated version "Wash" is "1" in FIG. 4. In addition to generating the bit value, the decoding application may also keep track of the number of bits generated as mechanism instances are found. Processing moves from operation 808 to operation 810.

At operation 810, determined bits are inserted into a bit stream. The bit stream may also include separator bit groups between each pattern determined at operation 808. Processing advances from operation 810 to decision operation 812.

At decision operation 812, a determination is made whether there is more text in the text stream to be searched for mechanism instances. If the text stream is completely searched, processing moves to optional operation 814. Otherwise, processing returns to operation 804 for further search of the mechanism instances.

Optional operations 814 through 818 form an analysis portion of the watermark decoding. At optional operation 814, the decoding application divides the bit stream into patterns and separators. The separators may be determined as explained in conjunction with FIG. 6. Processing proceeds from optional operation 814 to optional operation 816.

At optional operation 816, the patterns separated from the bit stream are inserted into a histogram. Generating a histogram is one method of analyzing the patterns to determine whether or not the text stream is watermarked. Other methods of analysis may also be implemented without departing from a spirit and scope of the invention. Processing proceeds from optional operation 816 to optional operation 818.

At optional operation 818, an analysis of the histogram may be performed. As described previously, patterns may be broken, order and/or number of patterns changed. During an analysis of the content, the number of encountered patterns as represented by the bit stream may be statistically analyzed to determine a likelihood that the processed text stream is derived from the original content.

One example method of analyzing the histogram is to select a pattern bucket that appears most frequently. A length of an untampered bit stream of patterns may be determined by multiplying a number of occurrences of that pattern with a sum of a length of the pattern and a length of the separator. The length of the separator may then be subtracted from the product to arrive at the length of the untampered bit stream. The length of the untampered bit stream divided by a length of the whole bit stream may provide a confidence parameter for uncorrupted percentage of watermark mechanism instances.

In a further embodiment, an analysis of the watermarking pattern may reveal a source of the watermarked content, if fingerprinting is employed. After optional operation 818, processing moves to a calling process for further actions.

The operations included in processes 700 and 800 are for illustration purposes. Providing a tamper-resistant text stream watermarking system may be implemented by a similar process with fewer or additional steps.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method for watermarking a plurality of text streams, the method comprising:
   determining at least one portion of a text stream to be watermarked;
   determining a watermarking mechanism to be applied to the at least one portion of the text stream, wherein determining the watermarking mechanism to be applied to the at least one portion of the text stream comprises determining a size of repeated binary format patterns associated with the watermarking mechanism, the repeated binary format patterns corresponding to a repeated application of the watermarking mechanism; and encoding the watermarking mechanism to the at least one portion of the text stream by modifying a content of the text stream without modifying a substance of the text stream, wherein encoding the watermarking mechanism to the at least one portion of the text stream comprises associating the at least one portion of the text stream with a bit of a binary format pattern associated with an application of the watermarking mechanism.

2. The computer-implemented method of claim 1, further comprising decoding the watermarking mechanism from a second text stream, wherein decoding the watermarking mechanism from the second text stream comprises determining whether at least a portion of the second text stream is derived from the first text stream.

3. The computer-implemented method of claim 1, wherein encoding the watermarking mechanism to the at least one portion of the first text stream includes patterned use of at least one of syntax modification, contractions, abbreviations, white spaces, blank line runs, spaces before tabs at start of line, spaces at end of line, line break types, banner comment character runs, and ordered variables.

4. The computer-implemented method of claim 1, further comprising distributing the watermarked first text stream through at least one of network communications, removable computer-readable media, and non computer-readable media.

5. The computer-implemented method of claim 1, wherein associating the at least one portion of the first text stream with the bit of the repeated binary format pattern that comprises associating the at least one portion of the first text stream with a first form of the watermarking mechanism and a second form of the watermarking mechanism.

6. The computer-implemented method of claim 5, wherein determining the size of the repeated binary format patterns associated with the watermarking mechanism includes determining the size of the repeated binary format patterns based on a distribution amount of an electronic file associated with the first text stream.

7. The computer-implemented method of claim 6, further comprising arranging each fingerprint to indicate a different version of the first text stream.

8. The computer-implemented method of claim 6, further comprising arranging each fingerprint to indicate a different authorized user of the first text stream.

9. The computer-implemented method of claim 1, further comprising encoding at least one other portion of the first text stream with the watermarking mechanism, wherein encoding the at least one other portion of the first text stream with the watermarking mechanism includes associating the at least one other portion of the first text stream with a repeated non-binary format pattern.

10. The computer-implemented method of claim 1, further comprising decoding the watermarking mechanism from a second text stream by deriving bit groups from a number of detected binary format patterns and combining the bit groups into a bit stream.

11. The computer-implemented method of claim 10, further comprising inserting a preset number of separator bits between the bit groups in the bit stream.

12. The computer-implemented method of claim 11, wherein the bit groups do not include the separator bits.

13. The computer-implemented method of claim 11, further comprising analyzing the bit stream to determine whether at least a portion of the second text stream is derived from the first text stream.

14. A method for protecting a programming code through fingerprinting, the method comprising:

determining at least one portion of a first programming code to be fingerprinted;

determining a fingerprinting mechanism to be applied to the at least one portion of the first programming code, wherein determining the fingerprinting mechanism to be applied to the at least one portion of the first programming code comprises determining a size of repeated binary format patterns associated with the fingerprinting mechanism, the fingerprinting mechanism being repeatedly encoded throughout the programming code;

encoding the fingerprinting mechanism to the at least one portion of the first programming code by modifying a text stream of the first programming code without altering the manner in which the first programming code compiles and executes prior to encoding, wherein encoding the fingerprinting mechanism to the at least one portion of the first programming code by modifying the text stream of the first programming code comprises encoding a repeated binary format pattern within the first programming code; and analyzing a second programming code to determine whether at least one portion of the second programming code is derived from the encoded at least one portion of the first programming code, wherein analyzing the second programming code to determine whether at least one portion of the second programming code is derived from the encoded at least one portion of the first programming code comprises:

detecting the fingerprinting mechanism used to encode the at least one portion of the first programming code in the at least one portion of the second programming code, wherein detecting the fingerprinting mechanism used to encode the at least one portion of the first programming code in the at least one portion of the second programming code comprises:

detecting the repeated binary pattern in the second programming code, the repeated binary pattern in the second programming code being associated with the repeated binary pattern used to encode the first programming code, wherein detecting the repeated binary pattern in the second code comprises associating a bit with a detected portion of the fingerprinting mechanism in the at least one portion of the second programming code, the bit corresponding to a portion of the repeated binary format pattern associated with the fingerprinting mechanism of the at least one portion of the first programming code.

15. The method of claim 14, wherein determining the size of the repeated binary format patterns associated with the fingerprinting mechanism comprises determining the size of the repeated binary format patterns based on a distribution amount of the first programming code.

16. The method of claim 15, further comprising arranging each fingerprint to indicate one of a different version of the first programming code and a different authorized user of the first programming code.

17. The method of claim 14, wherein analyzing the second programming code further comprises determining a number of repeated fingerprints in a bit stream that is derived from the repeated binary format pattern in the second programming code with preset separator bits inserted between each fingerprint.

18. A system for watermarking a text-based document, the system comprising:

an encoding application that, when executed by a processing unit coupled to a memory storage, is operative to:

determine at least one portion of a first document to be watermarked, determine a watermarking mechanism to be applied to the at least one portion of the first document based on an authorized distribution amount of a software associated with the first document and an interval at which the watermarking mechanism is to be repeatedly applied, the distribution amount of the software associated with the first document corresponding to a binary bit pattern size associated with encoding the watermarking mechanism, and encode the watermarking mechanism to the at least one portion of the first document by modifying a text of the at least one portion of the first document without modifying a substance of the first document, wherein the watermarking mechanism provides an identification for the at least one portion of the first document by associating the at least one portion of the first document with a bit of a binary bit pattern corresponding to the watermarking mechanism; and a decoding application that, when executed by the processing unit coupled to the memory storage, is operative to:

decode the watermarking mechanism from a second document based on a determination that at least one portion of the second document is derived from the first document, wherein the determination that the at least one portion of the second document is derived from the first document is made based on a detection of encoded portions of the at least one portion of the first document in the at least one portion of the second document, wherein the detection of encoded portions of the at least one portion of the first document in the at least one portion of the second document comprises:

an association of a bit with each detected encoded portion of the at least one portion of the second document, a formation of a bit sequence corresponding to the detected encoded portions of the at least one portion of the second document, and an interpretation of the bit sequence.

19. The system of claim 18, further comprising a watermark mechanism store that is arranged to provide a selection of watermarking mechanisms that include patterned use of at least one of syntax modification, contractions, abbreviations, white spaces, blank line runs, spaces before tabs at start of line, spaces at end of line, line break types, banner comment character runs, and ordered variables.

20. The system of claim 18, wherein the encoding application is arranged to encode the first document with multiple watermarking mechanisms.

* * * * *